May 19, 1931.  O. C. REEVES  1,806,179
JEWEL BEARING MOUNTING
Filed Jan. 24, 1927
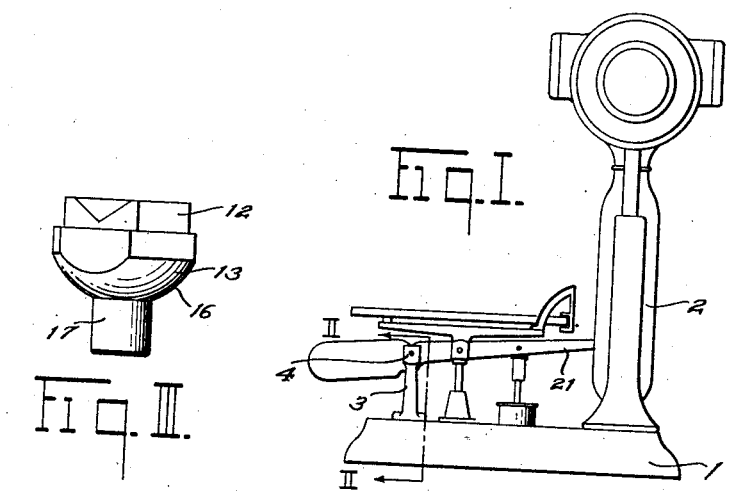
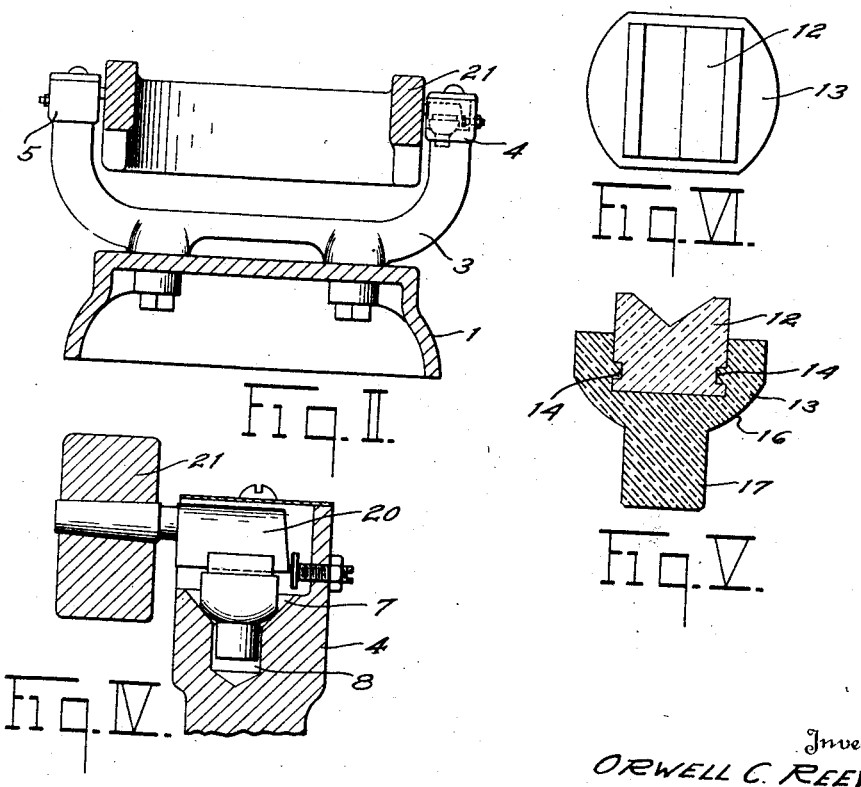
Inventor
ORWELL C. REEVES
By C.C. Marshall
Attorney Patented May 19, 1931

1,806,179

UNITED STATES PATENT OFFICE

ORWELL C. REEVES, OF TOLEDO, OHIO, ASSIGNOR TO TOLEDO SCALE MANUFACTURING COMPANY, OF TOLEDO, OHIO, A CORPORATION OF NEW JERSEY

JEWEL BEARING MOUNTING

Application filed January 24, 1927. Serial No. 163,008.

This invention relates to agate or jewel bearing mountings, and particularly mountings for bearings such as are commonly employed in weighing scales.

The principal object of this invention is the provision of a non-metallic mounting or support for jeweled weighing scale bearings.

Another object is to provide an inexpensive and reliable mounting for jeweled bearings whereby the mounting may be moulded around the bearing.

Still another object is the provision of a support for bearings which may be moulded to the exact dimensions required and thus obviate expensive and unnecessary machine work.

Still a further object is the provision of a support or mounting for a jeweled bearing constructed of phenolic condensation product composition.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a side elevational view of a weighing scale embodying my invention;

Figure II is a vertical sectional detail view taken substantially on the line II—II of Figure I;

Figure III is an enlarged view of the bearing and mounting of my invention;

Figure IV is an enlarged fragmentary sectional view showing a bearing of my invention supporting a scale lever pivot;

Figure V is an enlarged vertical sectional view through the bearing and its mounting;

Figure VI is a top plan view of parts shown in Figure V.

Referring to the drawings in detail, I have shown my invention as incorporated in a scale of the counter type. However, it is to be understood that my invention may be used in any type of machine, and, as the scale per se forms no part of the present invention, I will only describe it in such detail as to show the connection of my invention therewith.

The scale consists of a base 1 shown in Figure I which supports at one end an upright housing 2, the latter enclosing and supporting the load-counterbalancing and indicating mechanism.

Supported at the other end of the base 1 is a fulcrum stand 3 having upwardly extending ends 4 and 5, each of which contains the bearing and mounting of my invention. Referring particularly to Figure IV, the end of the fulcrum stand is provided with a frusto-conical socket 7 having a cylindrical terminal 8. Seated in the frusto-conical socket is the bearing element of my invention, which will hereinafter be more fully described, the element supporting a pivot of the main lever 10 of the scale.

The bearing element of my invention comprises a V-grooved bearing member 12, preferably of agate or other very hard material, around which is moulded a support or clip 13 of a hard phenolic condensation product, such as moulded bakelite or a bakelite moulding composition, as are now articles of commerce well known by these terms and requiring no further description relative to their chemical composition. The agate bearing 12 is provided with longitudinal grooves 14 which prevent the inadvertent removal of the bearing from its bakelite support. The bakelite support 12 is moulded with a spherical surface 16 which engages the wall of the frusto-conical socket 7, and, since the socket is conical and the engaging part of the bearing support spherical, the two parts are in contact along a circular line, and, while the bearing piece may turn in any direction, the seat is nevertheless firm in any position.

The apex line of the V-groove in the agate bearing 12 passes through the center of curvature and therefore lies along a diameter of the spherical surface 16. It will be obvious that when the bearing is seated in the socket 7 the apex line of the groove may turn about its center in any direction, but the center of the line must always remain in the same position and the bearing cannot, therefore, shift bodily. The bearing clip 13 is provided with a cylindrical stem 17 which loosely projects into the cylindrical socket 8 and serves to limit the relative movement of the bearing piece.

When the pivot 20 of the lever 21 engages the V-groove in the agate bearing 12 the bearing support 13 will be turned to a position in which the knife edge of the pivot lies in contact with the bottom of the groove for its entire length, and if there be any subsequent warping or deflection of the frames to which the pivot and bearing are attached, the bearing support will turn in its socket to maintain the coincidence of the knife edge of the pivot and the apex line of the bearing groove.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a bearing element having a V-shaped groove therein, and a clip of phenolic condensation product composition moulded around said bearing element having a portion of its surface spherical in form.

2. In a device of the class described, in combination, a bearing element of non-metallic material having a V-shaped groove therein, and a clip of phenolic condensation product composition moulded around said bearing element, said clip having a portion of its surface spherical in form, the apex of said groove passing through the center of curvature of said spherical surface.

3. In a device of the class described, in combination, a V-grooved agate bearing element, and a support of a phenolic condensation product composition moulded around said bearing element, said support having a portion of its surface spherical in form, the apex of said groove passing through the center of curvature of said spherical surface.

4. In a device of the class described, in combination, a V-grooved agate bearing element and a support of phenolic condensation product composition moulded around said bearing element, said support having a portion of its surface spherical in form, the apex of said groove passing through the center of curvature of said spherical surface, and said support having a lug projecting in a direction at right angles to the apex of said V groove.

ORWELL C. REEVES.